United States Patent

(12) United States Patent
Zou

(10) Patent No.: US 8,741,249 B2
(45) Date of Patent: Jun. 3, 2014

(54) UTILISATION OF DESALINATION WASTE

(75) Inventor: Linda Yuan Zou, Mawson Lakes (AU)

(73) Assignee: University of South Australia, Adelaide (AU)

( * ) Notice: Subject to any disclaimer, the term of this patent is extended or adjusted under 35 U.S.C. 154(b) by 213 days.

(21) Appl. No.: 13/130,423

(22) PCT Filed: Nov. 20, 2009

(86) PCT No.: PCT/AU2009/001512
§ 371 (c)(1),
(2), (4) Date: Jul. 15, 2011

(87) PCT Pub. No.: WO2010/057261
PCT Pub. Date: May 27, 2010

(65) Prior Publication Data

US 2011/0268633 A1    Nov. 3, 2011

(30) Foreign Application Priority Data

Nov. 21, 2008   (AU) ............................... 2008906021

(51) Int. Cl.
*B01D 53/34*       (2006.01)

(52) U.S. Cl.
USPC ............ 423/237; 423/352; 423/423; 423/422

(58) Field of Classification Search
USPC .................................. 423/237, 352, 423, 422
See application file for complete search history.

(56) References Cited

U.S. PATENT DOCUMENTS

| | | | |
|---|---|---|---|
| 1,570,299 A | 1/1926 | Galt | |
| 3,368,866 A | 2/1968 | Seguela | |
| 3,926,559 A * | 12/1975 | Stevens | ............................ 436/79 |
| 4,367,140 A * | 1/1983 | Wilson | ........................... 210/110 |
| 4,430,311 A | 2/1984 | Lee et al. | |
| 6,180,012 B1 | 1/2001 | Rongved | |
| 2007/0264183 A1 | 11/2007 | Krass | |

FOREIGN PATENT DOCUMENTS

| | | | |
|---|---|---|---|
| GB | 994601 A | | 6/1965 |
| JP | 51063379 A | * | 6/1976 |
| WO | WO0128925 A | | 4/2001 |
| WO | WO0196243 A | | 12/2001 |
| WO | WO2007094691 A | | 8/2007 |
| WO | WO2007139392 A | | 12/2007 |

OTHER PUBLICATIONS

International Search Report, for PCT/AU2009/001512, mailed Dec. 24, 2009, three (3) pages.
Chinese Search Report for Corresponding Chinese Application No. 2009801544359, mailed with Office Action, Mar. 15, 2013, 4 pages (all references other than above U. S. Patent are of record; CN3368866 actually US 3368866).

* cited by examiner

*Primary Examiner* — Melissa Stalder
(74) *Attorney, Agent, or Firm* — William J. Sapone; Ware Fressola Maguire & Barber LLP

(57) ABSTRACT

A process for producing soda ash from brine waste, the process including reacting brine waste with carbon dioxide and ammonia to produce soda ash, where in at least a portion of the ammonia is regenerated from the ammonium chloride produced during the reaction, the regeneration ideally be achieved by the use of a weak base anion exchange resin.

13 Claims, 4 Drawing Sheets

UTILISATION OF DESALINATION WASTE

This international patent application claims priority from Australian provisional patent application 2008906021 filed on 21 Nov. 2008, the contents of which are to be taken as incorporated herein by this reference.

FIELD OF THE INVENTION

The present invention relates generally to processes for the production of value added materials utilising saline waste streams, such as those from desalination processes. More specifically, the present invention relates to processes for the production of soda ash (sodium carbonate, $Na_2CO_3$) utilising saline waste streams and, optionally, carbon dioxide ($CO_2$) waste gases from combustion sources.

BACKGROUND OF THE INVENTION

The provision of adequate supplies of fresh water is a continuing and mounting problem worldwide. In many countries, the process of desalination of saline water, such as sea water, brackish water or saline industrial waste water, is used to supply fresh water. In Australia alone, it is predicted that approximately 460 gigaliters per annum of drinking water will be produced from desalination plants by 2013.

Typically, reverse osmosis (RO) membranes are used in desalination plants to desalinate sea water, brackish ground water and/or saline industrial waste water. The main objective of the desalination process is to reduce the salt (sodium chloride, NaCl) concentration of saline water to less than 0.5 grams per liter (g/L) suitable for drinking water. The salt concentration of sea water is typically 35-45 g/L.

Unfortunately, the use of desalination processes to produce fresh water from saline water present a number of environmental issues. For example, one of the by-products of the desalination process is brine waste which typically has a salt concentration of about 70 g/L. The highly saline liquid brine waste stream has to be disposed of and the typical methods used to do that include discharging it back to the ocean, disposing of it in the sewer, injecting it into deep wells, applying it to land, or transferring it to evaporation ponds. In each case, disposal of the waste imposes significant economic and/or environmental costs.

Ideally, brine waste from desalination processes would be used to form other, value added materials.

Reference to any prior art in this specification is not, and should not be taken as, an acknowledgment or any form of suggestion that this prior art forms part of the common general knowledge in any country.

SUMMARY OF THE INVENTION

The present invention arises from the discovery that brine waste and, optionally, carbon dioxide waste gases from combustion sources, can be used as starting materials in a process for the production of soda ash.

The present invention provides a process for producing soda ash from brine waste, the process including reacting brine waste with carbon dioxide and ammonia to produce sodium bicarbonate and ammonium chloride in a reaction mixture, the process including:

i. separating the sodium bicarbonate from the reaction mixture to produce sodium bicarbonate and a first mother liquor containing ammonium chloride;

ii. converting the sodium bicarbonate to soda ash; iii. treating the first mother liquor to produce purified water and a concentrated ammonium chloride; and iv. treating the concentrated ammonium chloride with a base anion exchange resin to regenerate ammonia suitable for use in the reaction;

wherein at least a portion of the ammonia is regenerated from ammonium chloride produced during the reaction.

Typically, the process will include collecting sodium bicarbonate produced during the reaction and heating the collected sodium bicarbonate to produce the soda ash. Additionally, the ammonium chloride produced during the reaction will preferably be treated with a base anion exchange resin (such as a weak base anion exchange resin) to regenerate the ammonia. This regeneration will preferably occur after further treatment (such as concentrating) of the ammonium chloride produced during the reaction.

As used herein, the term 'brine waste' refers to a saline solution having a sodium chloride concentration of between about 50 g/L and about 250 g/L, inclusive. Advantageously, the brine waste may be a waste stream from a desalination plant, such as a reverse osmosis desalination plant.

The process may also include treating the brine waste to remove at least some of any undesired inorganic cations (such as calcium, magnesium and strontium ions) present in the brine waste prior to the reaction with carbon dioxide and ammonia. The undesired inorganic cations present in the brine waste may be removed either partially or entirely by selectively binding those ions with a binding agent, such as a cation exchange resin.

The carbon dioxide used in the process of the present invention will preferably be obtained from a waste gas stream derived directly or indirectly from combustion sources, such as coal or gas or diesel fired power stations, steel works or petroleum refineries. In this form, the carbon dioxide may be treated to remove some or all of any gaseous contaminants that may be present in the stream.

The reaction of sodium chloride and carbon dioxide to produce soda ash is catalyzed by ammonia, and in the present invention at least a portion of the ammonia that is used as the catalyst is regenerated from ammonium chloride produced during the reaction. As mentioned above, the ammonium chloride produced during the reaction will ideally be filtered, after collection of the sodium bicarbonate, by a high pressure filter such as a reverse osmosis membrane to provide purified water that can be reused, and at the same time to concentrate the remaining ammonium chloride solution. Furthermore, the concentrated ammonium chloride solution will then be the solution treated with a base to regenerate ammonia suitable for reuse in the reaction, and in one form the base will be an anion exchange resin.

As mentioned above, at least a portion of the ammonia used in the reaction of the brine waste and the carbon dioxide is the regenerated ammonia. In this respect, the regenerated ammonia may make up at least 10%, and preferably somewhere between 20% and 80%, of the ammonia required for the reaction. Ideally, all of the ammonia regenerated will be returned to the reactor, and an amount of fresh ammonia will be added to the reactor to make up the ammonia solution strength as required for the reaction. It will thus be appreciated that the amount of fresh ammonia used in the reactor will be dependent upon the operating parameters of each individual operation that might utilise the process of the present invention.

The basic chemical reactions involved in the process of the present invention are similar to the Solvay process which is currently used industrially to produce soda ash. The traditional Solvay process produces soda ash from concentrated brine (as a source of sodium chloride (NaCl)) and from limestone (as a source of calcium carbonate ($CaCO_3$)).

Unfortunately though, the traditional Solvay process is an energy intensive process. Firstly, the reactant carbon dioxide gas is obtained by heating limestone in a kiln to drive off carbon dioxide gas. This is an energy intensive step, not only consuming a large amount of thermal energy (typically, it requires 2.2-2.8 GJ/ton of soda ash), but also producing surplus greenhouse gas carbon dioxide (typically, 200-400 kg/ton soda ash) which is usually released to the atmosphere.

As mentioned, the brine used as a starting material in the traditional Solvay process is a concentrated brine solution, typically having a salt concentration of about 300 g/L. However, we have discovered that brine having a significantly lower salt concentration can successfully be used in a modified Solvay process to produce soda ash. This leads to the environmentally positive outcome of being able to use brine waste as a starting material in soda ash production.

Advantageously, in the process of the present invention the brine waste may be a waste stream from a desalination plant. Desalination plants are used to reduce the salt concentration of sea water, brackish water, saline industrial waste water, and the like. The desalination plant may be a reverse osmosis desalination plant, in which case, the brine waste may have a sodium chloride concentration of greater than about 50 g/L and less than about 250 g/L. In some forms of the present invention, the sodium chloride concentration of the brine waste is greater than about 50 g/L and less than about 250 g/L. In other forms, that lower limit of the range may be 60 g/L, 70 g/L, 80 g/L, 90 g/L, or 100 g/L.

The present invention therefore also provides a process for producing soda ash, the process including the steps of:
a) providing brine waste having a sodium chloride concentration of between about 50 g/L and about 250 g/L;
b) treating the brine waste to remove at least some of any undesired inorganic cations present to provide pre-treated brine waste;
c) reacting the pre-treated brine waste with carbon dioxide in the presence of ammonia, at least a portion of which is regenerated ammonia from step (g);
d) separating sodium bicarbonate produced during the reaction of the brine waste with carbon dioxide from the reaction mixture to provide collected sodium bicarbonate and a first mother liquor containing ammonium chloride;
e) heating the collected sodium bicarbonate to produce soda ash;
f) filtering the first mother liquor to produce purified water and a second mother liquor containing concentrated ammonium chloride; and
g) treating the second mother liquor with a base anion exchange resin to regenerate ammonia suitable for use in the reaction of step (c).

Of course, the present invention provides soda ash produced by the above described processes. Soda ash is an important industrial chemical. Soda ash is used to regulate pH in many chemical process streams. For example, it is the most widely used fixed alkali for the manufacture of other alkali products, sodium salts, glass, soap, sodium silicates, detergent, bicarbonates, bichromates, cellulose and rayon, iron and steel, aluminium, cleaning compounds, textiles and dye-stuffs, drugs and many other materials. It is also used as an alkali for household purposes and as washing powder by laundries. It is used in the manufacture of glass, chemicals, such as sodium silicates and sodium phosphates, the pulp and paper industries, the manufacture of detergents and for the treatment of water. The superior buffering capacity of soda ash versus caustic soda offers advantages in adjusting plant wastewater pH ranges.

The present invention provides a more sustainable approach to soda ash production. Firstly, the process of the present invention utilises brine waste as a starting material, thereby ameliorating the need to dispose of brine waste from desalination plants in the typical manner. Secondly, the present invention is also able to release at least a small portion of the water contained in a brine waste as purified water for re-use. Thirdly, the present invention can use carbon dioxide that is obtained from emissions from a combustion source, such as coal or gas or diesel fired power station, steel works or petroleum refinery, as a starting material for the reaction. Finally, and in contrast with the traditional Solvay process, limestone and subsequent lime milk need not be used in the process of the present invention.

BRIEF DESCRIPTION OF THE FIGURES

The present invention will now be described in relation to a preferred embodiment, of which some aspects are illustrated in the accompanying figures. In the figures.

DESCRIPTION OF A PREFERRED EMBODIMENT

The present invention provides a process for producing soda ash from brine waste. The process includes treating brine waste with carbon dioxide and ammonia under conditions to produce soda ash. In this respect, the term soda ash means a composition that contains predominantly sodium carbonate ($Na_2CO_3$). Soda ash may not be pure sodium carbonate and may contain other compounds including, for example, sodium bicarbonate ($NaHCO_3$).

Figure 1:
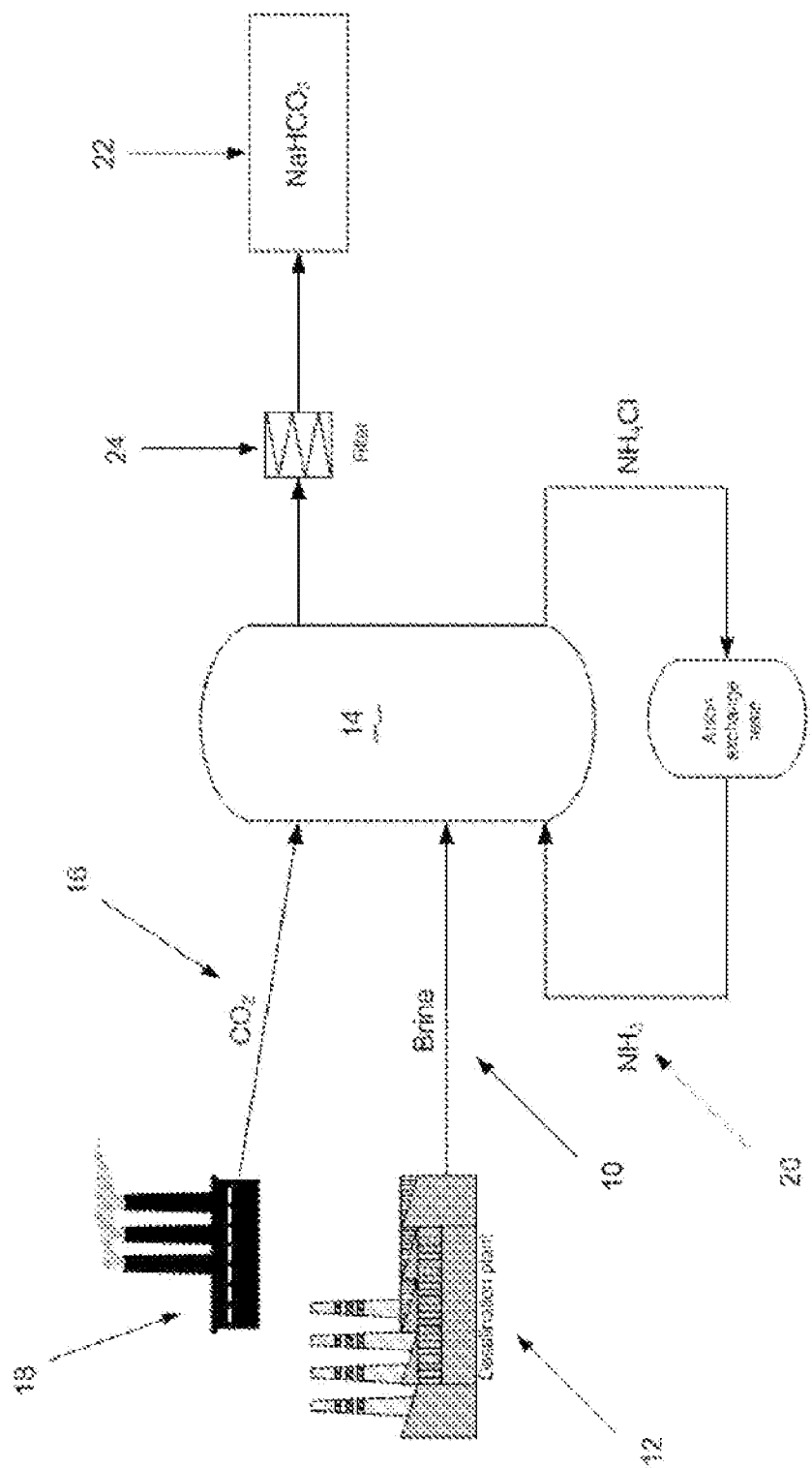
FIG. 1 is a general flow diagram of a process for producing soda ash according to the present invention.

Referring to FIG. 1, brine waste 10 from a desalination plant 12 is fed into a reaction vessel 14. The brine waste 10 may be subjected to the process of the present invention on-site at a desalination plant, or it may be stored and/or packaged for transportation to an off-site processing facility. Of course, to reduce the costs and environmental impact of transport, the brine waste is ideally treated on-site at a desalination plant.

Indeed, it should also be appreciated that the brine waste could be obtained from waste streams from other desalination plants, including plants that use thermal desalination processes such as Multistage Flash Distillation (MFD), Multiple Effect Distillation (MED) and Mechanical Vapour Compression (MVC). These processes all generate concentrated brine streams that can be utilised for soda ash production as described herein.

Carbon dioxide 16 that is obtained from emissions from a combustion source 18 is introduced into the reaction vessel 14 and passed through the brine waste 10 in the vessel. The carbon dioxide 16 is ideally obtained from emissions from coal or gas or diesel fired power stations, steel works, petroleum refineries, and the like. Ammonia 20 is also introduced into the reaction vessel 14 and passed through the brine waste 10. Typically, ammonia 20 is introduced into the reaction vessel 14 first followed by introduction of the carbon dioxide 16. The overall reaction process is:

$$NaCl + CO_2 + NH_3 + H_2O \rightarrow NaHCO_3 + NH_4Cl$$

The reaction of the brine waste 10 with carbon dioxide 16 and ammonia 20 can also be carried out in two stages. In the first stage, ammonia 20 would be bubbled through the brine waste 10 so that it is absorbed by the brine waste to produce ammoniated brine. In the second stage, carbon dioxide 16 would be bubbled through the ammoniated brine.

During or after the reaction, sodium bicarbonate ($NaHCO_3$) precipitates out of solution. The sodium bicarbonate precipitates because in a basic solution, sodium bicarbonate is less water-soluble than sodium chloride. The ammonia ($NH_3$) buffers the solution at a basic pH; without the ammonia, a hydrochloric acid by-product would render the solution acidic, and arrest the precipitation.

The sodium bicarbonate that precipitates out in reaction is filtered using a filter 24 and then dried to form a dried sodium bicarbonate precipitate 22. This dried sodium bicarbonate precipitate 22 is subsequently converted to soda ash by calcination (160-230° C.), producing water and carbon dioxide as by-products, as per the following process:

$$2NaHCO_3 \rightarrow Na_2CO_3 + H_2O + CO_2$$

The water and carbon dioxide produced during this final calcination step (not shown in FIG. 1) may be captured and re-used as a starting material in the process or they may be fed directly into the process as required.

The solution remaining from the reaction vessel 14 contains ammonium chloride ($NH_4Cl$). In the traditional Solvay process, the mother liquor obtained after filtration is reacted with quicklime (calcium oxide (CaO)) left over from the calcination step ($CaCO_3 \rightarrow CO_2 + CaO$) to regenerate ammonia which is recycled back to the initial brine solution. Unfortunately, and as mentioned above, this step generates large amounts of calcium chloride solids that are typically disposed of into a waterway. In the general process of the present invention illustrated in FIG. 1, ammonia is regenerated from the ammonium chloride by passing the solution containing ammonium chloride through a regeneration step such as an anion exchange resin 26. No solid wastes are generated in this regeneration step and, therefore, the environmental impact of the process is further reduced.

Figure 2:
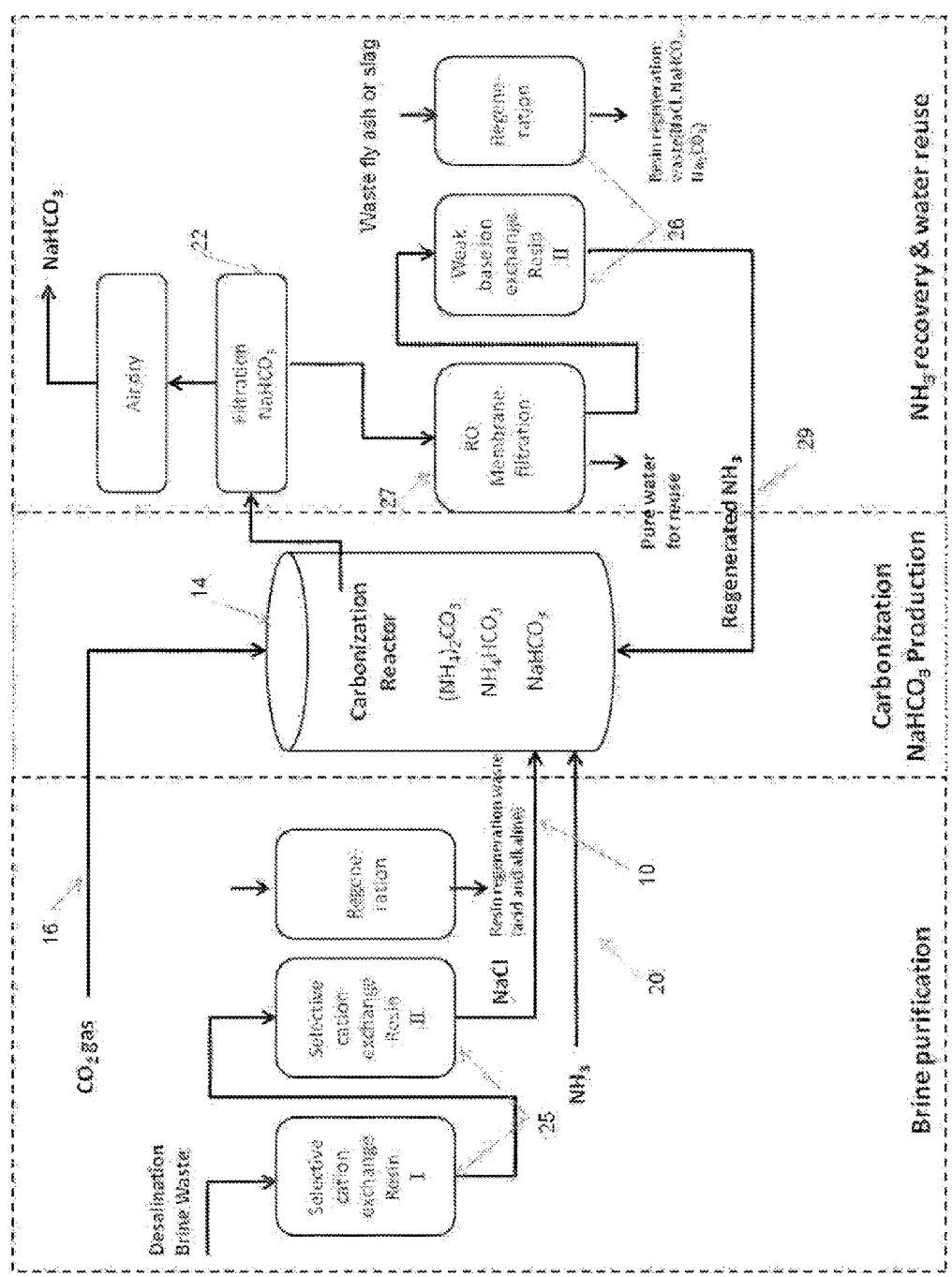
FIG. 2 is a detailed flow diagram of a process for producing soda ash according to the present invention.

Referring now to the more detailed flow diagram of FIG. 2, it will be seen that in some embodiments the process can also include treating the brine waste 10 to remove at least some of any undesired inorganic cations present in the brine waste prior to its treatment in the reactor 14 with carbon dioxide and ammonia. Examples of undesired inorganic cations are ions that may interfere with the soda ash production process include, but are not limited to, calcium, magnesium or strontium ions.

At least some of any undesired inorganic cations present in the brine waste 10 may be removed by selectively binding those ions with a binding agent. Thus, the flow diagram of FIG. 2 shows the brine waste moving through dual cation exchange treatment processes, where the brine waste is treated with a binding agent that selectively binds calcium ions, a binding agent that selectively binds magnesium ions, and/or a binding agent that selectively binds strontium ions. In this embodiment, the binding agent is a cation exchange resin. For example, the cation exchange resin may be AMBERLITE IRC748, which is an iminodiacetic acid chelating cation exchange resin with high selectivity for calcium, magnesium and strontium.

Additionally, in some reverse osmosis desalination plants it is a standard practice to dose the feed sea water with an antiscalant, such as polyacrylic acid, to prevent membrane fouling. The antiscalants are rejected by the filtration membrane and remain in the brine waste. An anion exchange resin can also be used to remove these antiscalants and other organic matters. This step may alternatively be an activated carbon absorption step, an advanced oxidation step, or a combination of all of these described steps.

The carbon dioxide gas 16 used in the reaction may be pumped directly from its source to the reaction vessel 14 containing the ammoniated brine solution. Alternatively, the carbon dioxide gas may be captured off site and stored in an appropriate vessel (such as a cylinder) for transport to the site where the reaction is carried out.

In some cases, when the carbon dioxide gas is derived from a waste stream, it may be desirable to scrub the waste stream to remove some or all of any gaseous contaminants that may be present in the stream. Examples of gaseous contaminants that may need to be removed include nitrogen oxides ($NO_x$) and sulphur dioxide (SO2). In some cases, the impurities $NO_2$ and $SO_2$ can be converted into nitrate ion and sulphate ions. The sodium salts of these ions are more soluble than sodium bicarbonate so the salts remain in solution and can be finally removed by, for example, membrane filtration before the reuse of water.

At least a portion of the ammonia 20 that is used to treat the brine waste may be obtained from any suitable source. However, it is possible to regenerate and then reuse ammonia from ammonium chloride produced during the reaction in the reaction vessel 14, and thus it is advantageous to re-use the ammonia regenerated in this manner, such that at least a portion of the ammonia used in the reaction is regenerated ammonia.

In flow diagram of FIG. 2, the ammonium chloride produced during the reaction is filtered (after filtration 26 to collect the sodium bicarbonate formed from the brine waste, the carbon dioxide and the ammonia in vessel 14) in a membrane filter 27 to concentrate the ammonium chloride solution. This concentrate may then be treated with a base in an ion exchange process 26 to generate ammonia suitable for reuse in the reaction. Any suitable base may be used in this ion exchange process. Advantageously, the base is a weak base anion exchange resin.

For example, the concentrated ammonium chloride may be passed through a column containing an anion exchange resin, such as AMBERLYST A23 or AMBERLITE IR 45, which are highly porous granular weak base anion exchange resins, both showing sufficient alkali capacity to be used for the purpose of ammonia regeneration, or such as AMBERLITE IRA 400, a strong base anion exchange resin. The chloride ions in the concentrate will be absorbed, and the hydroxyl ions will be exchanged to the concentrate from the resin. The effluent of the anion exchange resin column contains ammonia with high alkalinity, and can be returned (via stream 29) back to the carbonization reactor.

Sodium carbonate (soda ash) may also be used to itself regenerate spent anion exchange resin, as represented schematically in FIG. 2 by the stage 31. The weak base anion exchange resins can be efficiently regenerated by much weaker sodium carbonate solution, such as 1% of sodium carbonate (noting that the recommended regeneration concentration is 5% sodium carbonate). Experiments have shown that after an initial difference, the effluent from both resins quickly stabilizes to the same pH. This implies that the resin has the same usable capacity under both regeneration conditions. The advantage of the lower concentration is that much less material is wasted (a five fold reduction in chemical consumption). In this respect, it will also be appreciated that the alkaline waste produced from the regeneration of the weak base cation resin (stage 25) can be used to regenerate weak base anion exchange resin (stage 26).

Advantageously, and as mentioned above, the present invention avoids the need to use energy intensive lime milk and steam distillation for ammonia regeneration, as in the traditional Solvay process. The weak base anion exchange resin can be regenerated by weak waste alkali which is available from several industries, such as alkaline fly ash from brown coal combustion or slag from steel mill.

With particular regard to the use of the base anion exchange resins, testwork has been conducted on the weak base anion exchange resins to confirm that they exhibit the most potential to be regenerated by weak waste alkali.

With that in mind we have tested AMBERLITE IR 45 at both the recommended regeneration concentration of 5% sodium carbonate and also at a much weaker solution of 1% sodium carbonate. Both the quantity of regenerant required and the degree of regeneration of the resin was tested. This was done by passing regenerant solution through the resin until the effluent was as close in pH to the regenerant as practical and then rinsing with deionised water until the effluent was neutral. For both solutions this was 8 bed volumes of regenerant solution. Then, 5% sodium chloride solution was introduced and the pH of the effluent was monitored.

Figure 3:
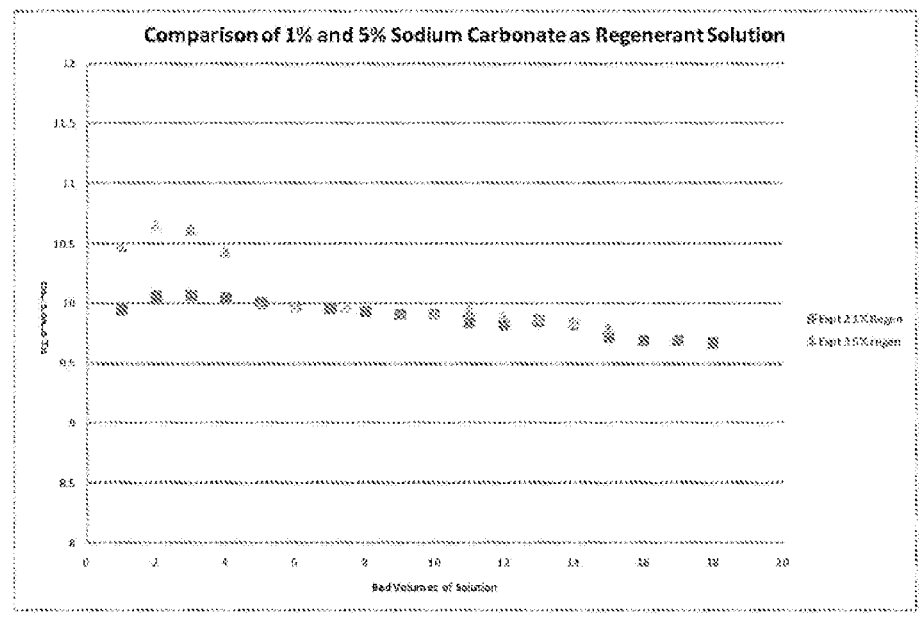
FIG. 3 is a graph showing a comparison of different concentrations of sodium carbonate for use as a regenerant solution for ion exchange resin.

Plots of these experiments (see FIG. 3) show that, after an initial difference, the effluent from both resins quickly stabilizes to the same pH. This implies that the resin has the same usable capacity under both regeneration conditions.

The advantage of the lower concentration is that much less material is wasted (a five fold reduction in chemical consumption). This is probably because the pH of a 5% solution of sodium carbonate is 11.5 whereas the 1% solution is 11.1. This small difference is due to the equilibrium dissociation of carbonate and water to give hydroxide anion. Because the active material in this solution is not sodium ($Na^+$), but hydroxide ion ($OH^-$), there is little difference in actual concentration and both are in excess of what is required.

DESCRIPTION OF AN EXAMPLE

In order to illustrate an embodiment of the present invention, the following experimental work was conducted, the results of which are reported in Table 1 below, the work being conducted primarily in order to investigate the effects of $CO_2$ concentrations and brine concentrations.

The experimental procedure was as follows:

1) Making reaction solution—NaCl prepared in different concentration levels was weighed and put into a flask, in concentrations of 216 g/l, 147 g/l, and 100 g/l. 125 mL of 28% ammonium water and 275 mL of miliQ water was added to the flask. The flask was capped and the NaCl dissolved with the use of a magnetic stirrer. The solution was transferred into a gas washing bottle and covered, and for 15 minutes the washing bottle was placed in a bath set up at temperature 20° C.

2) Gas mixture—gas cylinders supplying $CO_2$, $N_2$, $SO_2$ and $NO_2$ were set up with mass flow controllers (based on the "multibus" concept) for certain flow rates and for desired mixing ratios. The percentage of $CO_2$ was set up at 5%, 7.5%, 10% and 15% to simulate expected industrial conditions, and accordingly, the percentages of $N_2$ were set up at 95%, 92.5%, 90% and 85% respectively), following which the gas tube was connected to the gas washing bottle.

3) Chemical reaction—the chemical reaction was allowed to proceed to equilibrium (for about 15 hours), following which the gas was turned off and the as tube disconnected. The reacted solution was allowed to sit overnight in the gas washing bottle for crystallization.

4) Filtering—the reacted solution was mixed well in the gas washing bottle, and the reacted solution was discharged into a membrane filtering device. The material collected by the filter was removed after 30 minutes and placed into an evaporating dish.

5) Drying—the evaporating dish was placed in a fume cupboard at 298K for drying, and the product was weighed after 2 days of drying.

Figure 5:
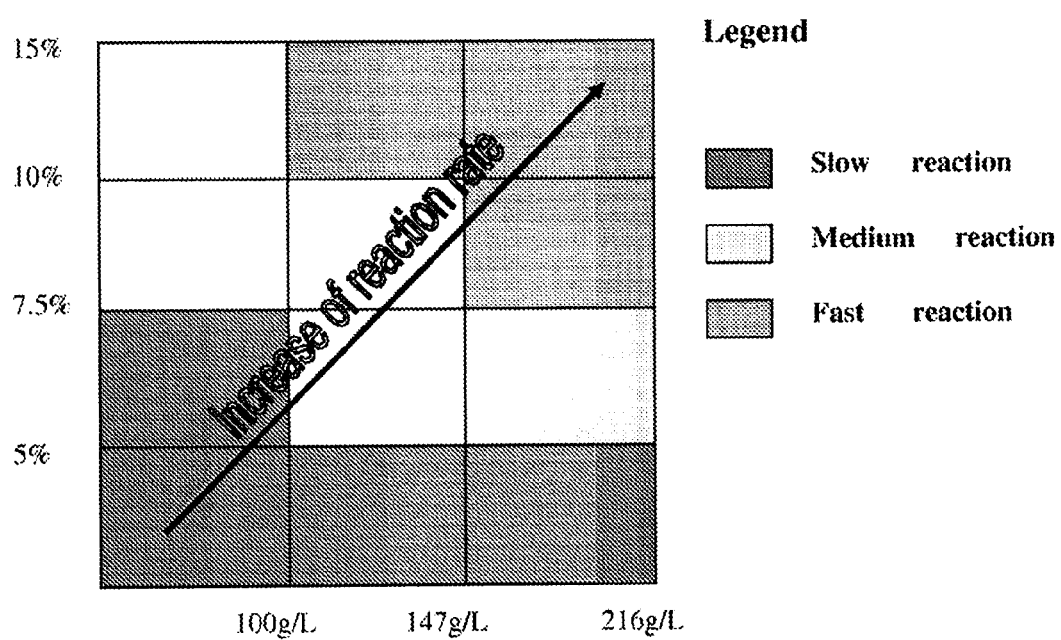

Referring to FIG. 5, the experimental work showed the following relationship between $CO_2$ concentrations and NaCl concentrations on the process reaction rate, showing an ideal reaction rate at $CO_2$ concentrations above about 7.5% and NaCl concentrations above about 147 g/L.

Additionally, the experimental work showed the following comparative recoveries from the relationship between $CO_2$ concentrations and NaCl concentrations, which confirms the production of $NaHCO_3$ at different NaCl and $CO_2$ concentrations.

| Data presented in the order of $CO_2$ concentrations | | | | |
|---|---|---|---|---|
| | Concentration Of NaCl(g/l) | Percentage of $CO_2$ | Total equilibrium time | Unwashed Product |
| 216-15 | 216 | 15 | 10 hrs | 13.36 |
| 216-15 | 216 | 15 | 20 hrs | 39.68 |
| 100-15 | 100 | 15 | 14 hrs | 12.06 |
| 147-10 | 147 | 10 | 14 hrs | 9.84 |
| 100-10 | 100 | 10 | 15 hrs | 5.67 |
| 147-7.5 | 147 | 7.5 | 15 hrs | 7.47 |
| 100-7.5 | 100 | 7.5 | more than 20 hrs | 4.48 |
| 216-5 | 216 | 5 | more than 20 hrs | 7.84 |
| 147-5 | 147 | 5 | More than 20 hrs | 6.13 |

| Data presented in the order of NaCl concentrations | | | | |
|---|---|---|---|---|
| | Concentration Of NaCl(g/l) | Percentage of $CO_2$ | Total equilibrium time | Unwashed Product |
| 216-15 | 216 | 15 | 10 hrs | 13.36 |
| 216-15 | 216 | 15 | 20 hrs | 39.68 |
| 216-5 | 216 | 5 | more than 20 hrs | 7.84 |
| 147-10 | 147 | 10 | 14 hrs | 9.84 |
| 147-7.5 | 147 | 7.5 | 15 hrs | 7.47 |
| 147-5 | 147 | 5 | More than 20 hrs | 6.13 |
| 100-15 | 100 | 15 | 14 hrs | 12.06 |
| 100-10 | 100 | 10 | 15 hrs | 5.67 |
| 100-7.5 | 100 | 7.5 | more than 20 hrs | 4.48 |

Figure 4:
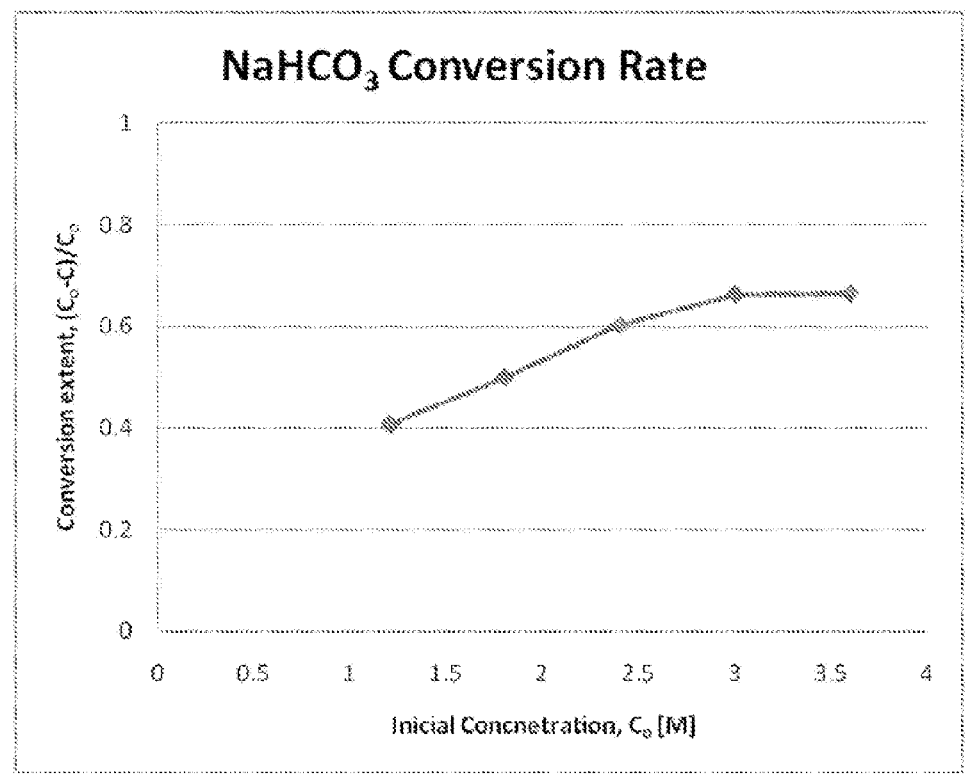
FIG. 4 is a plot of sodium bicarbonate ($NaHCO_3$) conversion rates with varying initial brine concentrations, and, FIG. 5 is a chart showing the relationship between $CO_2$ concentrations and NaCl concentrations on the process reaction rate.

It will be appreciated that FIG. 4 represents the conversion rates to sodium bicarbonate based on to its initial Na+ concentrations. FIG. 4 shows that the conversion rates, represented as $(C_0-C_e)/Co$, increased with increasing $Na^+$ concentration in a logarithmic shaped trend.

Finally, it will be appreciated that various modifications and variations of the methods and compositions of the invention described herein will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are apparent to those skilled in the art are intended to be within the scope of the present invention.

The invention claimed is:

1. A process for producing soda ash from brine waste, utilizing high pressure filtration and ion exchange for regenerating ammonia from a mother liquor generated during production of the soda ash, the process comprising:
   reacting brine waste with carbon dioxide and ammonia to produce a reaction mixture containing sodium bicarbonate and ammonium chloride;
   separating the sodium bicarbonate from the reaction mixture to produce a first mother liquor containing ammonium chloride;
   converting the sodium bicarbonate separated from the reaction mixture to soda ash;
   filtering the first mother liquor at high pressure to produce purified water and a concentrated ammonium chloride solution;
   treating the concentrated ammonium chloride solution with a base anion exchange resin for regenerating ammonia suitable for use in reacting the brine waste with carbon dioxide and ammonia; and,
   using the ammonia regenerated from the concentrated ammonium chloride solution for supplying at least 10% of the ammonia used in reacting the brine waste with carbon dioxide and ammonia to produce the reaction mixture.

2. A process according to claim 1, further comprising heating the sodium bicarbonate separated from the reaction mixture to produce soda ash.

3. A process according to claim 1, wherein 20 to 80% of the ammonia used in the reaction is regenerated ammonia.

4. A process according to claim 1, further comprising providing a brine waste which has a sodium chloride concentration of greater than about 50 g/L and less than about 250 g/L.

5. A process according to claim 1, wherein the brine waste is a waste stream from a desalination plant, or is derived from a waste stream from a desalination plant.

6. A process according to claim 1 further comprising obtaining at least a majority of the carbon dioxide used in the reaction from a waste gas from a combustion source.

7. A process according to claim 1 further comprising pretreating the brine waste to remove at least some of any undesired inorganic cations present in the brine waste prior to the treatment with carbon dioxide and ammonia.

8. A process according to claim 7, wherein undesired inorganic cations are selected from the group consisting of calcium, magnesium, and strontium ions.

9. A process according to claim 7 further comprising removing the undesired inorganic cations present in the brine waste either partially or entirely by selectively binding those ions with a binding agent.

10. A process according to claim 9, wherein the binding agent is a cation exchange resin.

11. A process according to claim 5 further comprising heating the sodium bicarbonate separated from the reaction mixture to produce soda ash.

12. A process for producing soda ash, utilizing high pressure filtration and ion exchange for regenerating ammonia from a mother liquor generated during production of the soda ash, the process including the steps of:
   a) providing brine waste having a sodium chloride concentration of between about 50 g/L and about 250 g/L;
   b) treating the brine waste to remove at least some of any undesired inorganic cations present to provide pretreated brine waste;
   c) reacting the pretreated brine waste with carbon dioxide in the presence of ammonia, at least a portion of which is regenerated ammonia;
   d) separating sodium bicarbonate produced during the reaction of the brine waste with carbon dioxide from the reaction mixture to provide collected sodium bicarbonate and a first mother liquor containing ammonium chloride;
   e) heating the collected sodium bicarbonate to produce soda ash;
   f) filtering the first mother liquor using high pressure membrane filtration to produce purified water and a second mother liquor containing concentrated ammonium chloride;
   g) treating the second mother liquor with a base anion exchange resin to regenerate ammonia suitable for use in the reaction of step (c); and,
   h) using the ammonia regenerated from the second mother liquor for supplying at least 10% of the ammonia used in the reaction of step (c).

13. A process according to claim 12, wherein the base anion exchange resin is a weak base anion exchange resin.

* * * * *